United States Patent
Kuroda

[11] 3,783,156
[45] Jan. 1, 1974

[54] METHOD OF MAKING BEADED ARTICLE

[75] Inventor: Minoru Kuroda, Amagasaki, Japan

[73] Assignees: Nishizawa Shoji Co. Ltd., Osaka, Japan; The Dimension Weld International Corporation, New York, N.Y.

[22] Filed: Jan. 24, 1972

[21] Appl. No.: 220,300

Related U.S. Application Data

[63] Continuation of Ser. No. 808,128, March 18, 1969, abandoned.

[30] Foreign Application Priority Data
Dec. 19, 1966 Japan.................................. 41/83085

[52] U.S. Cl................... 264/94, 156/210, 156/221, 156/276, 156/292, 161/5, 161/162, 161/164, 264/112, 264/163, 264/248

[51] Int. Cl... B29c 17/10, B29c 21/00, B29c 27/02, B32b 31/18, B32b 31/20

[58] Field of Search...................... 264/112, 248, 94, 264/163; 161/162, 5, 73, 74, 119–124, 164, 168, 409; 156/276, 196, 209, 210, 219–221, 289–292

[56] References Cited
UNITED STATES PATENTS

| | | | |
|---|---|---|---|
| 3,446,685 | 5/1969 | Goldstone et al. | 161/121 X |
| 3,256,131 | 6/1966 | Koch et al. | 156/209 X |
| 2,878,153 | 3/1959 | Hacklander | 264/248 |
| 2,749,640 | 6/1956 | Scott | 161/28 X |
| 2,693,221 | 11/1954 | Lyijynen | 156/209 |
| 2,987,103 | 6/1961 | Yakubik | 161/409 X |
| 3,142,599 | 7/1964 | Chavannes | 156/210 |
| 2,710,046 | 6/1955 | Markus et al. | 161/40 |
| 3,047,136 | 7/1962 | Graham | 161/168 X |
| 3,244,571 | 4/1966 | Weisman | 156/196 |

FOREIGN PATENTS OR APPLICATIONS
950,262  2/1964  Great Britain.......................... 161/2

Primary Examiner—Robert F. White
Assistant Examiner—J. H. Silbaugh
Attorney—Michael S. Striker

[57] ABSTRACT

A beaded article having a support layer on which a bottom layer and a top layer of sheet material are superimposed. The top layer is heat bonded to the bottom layer and both are heat bonded to the support layer along a circumferentially complete narrow annular zone. In the area circumscribed by the annular zone the top layer is provided with a raised self-supporting bead-like prominence which contains ornamental particles visible to a viewer because the top layer is of transparent material.

8 Claims, 8 Drawing Figures

INVENTOR
MINORU KURODA
BY
ATTORNEY 3,783,156

METHOD OF MAKING BEADED ARTICLE

CROSS-REFERENCE TO RELATED APPLICATIONS

The present application is a continuation of abandoned application Ser. No. 808,128. filed Mar. 18, 1969, which in turn was a continuation-in-part of my copending application, Ser. No. 662,962 filed on Aug. 24, 1967 and entitled "METHOD AND APPARATUS FOR FORMING APPLIQUE DESIGNS", and now abandoned.

BACKGROUND OF THE INVENTION

The present invention relates generally to beads, and more particularly to a method of making a beaded article.

In my aforementioned copending application Ser. No. 662,962, I have disclosed a raised padded applique, as well as a method and apparatus for making such an applique. As there pointed out, such an applique can be made by superimposing two layers of material, sandwiching a layer of padding material between them, and bonding the two layers together across the intermediate layer of padding material along a circumferentially complete narrow annular zone. The applique will then appear on one layer as a raised padded design.

My deliberations have shown that I am able to make an article having a beaded appearance, again resorting to the use of bondable sheet material assemblies.

SUMMARY OF THE INVENTION

It is, accordingly, a general object of the present invention to provide a method of making a beaded article.

An additional object of this invention is to provide such a method which is simple and inexpensive and which permits the affixing of large or small numbers of simulated beads to an article, such affixing carried out simultaneously for all simulated beads or individually.

In pursuance of the above objects, and others which will become apparent hereafter, one feature of my invention resides in the provision of a method of making a beaded article of the type under discussion; wherein I superimpose upon a base an assembly comprising a top and a bottom layer of sheet material with spacing means therebetween. At least the top layer consists of a plastically flowable material. I thereupon press the top layer against the bottom layer and the base in a circumferentially complete narrow annular zone while maintain the top layer spaced from the bottom layer in the area which is circumscribed by the annular zone. While the pressure is in effect, I heat-bond the layers to one another as well as to the base in the aforementioned circumferentially complete narrow annular zone and simultaneously cause the top layer to undergo plastic flowing inwardly of the annular zone as well as in direction away from the bottom layer. This results in the formation of a raised self-supporting bead-like prominence in the aforementioned area of the top layer.

Advantageously the top layer will be a light-transmitting sheet material, particularly a synthetic plastic material, and I prefer that the top layer be a transparent plastic material. The bottom layer may also be a transparent plastic material and may, but need not be capable of plastic flowing. The spacing means is advantageously in form of discrete particles having an ornamental appearance, that is being colored, light-reflecting or the like, and they will be visible in the interior of the bead-like prominence providing a desired appearance to the same. Of course, the base may be of any desired suitable material, for instance a textile material such as a dress, an other garment or the like, to which one or, usually, more than one of the bead-like prominences are to be affixed.

By resorting to my novel invention I obtain an article wherein large or small numbers of such bead-like prominences may be affixed simultaneously, and it goes without saying that they may be arranged in any desired pattern, as will be discussed in more detail below. By contrast it should be pointed out that the affixing of conventional beads to an article is to this day carried out by hand and individually, with the result that articles which are beaded in the customary manner are very expensive because of the manual labor involved.

It should be further pointed out that an article according to my present invention has the bead-like prominences affixed thereto permanently so that they will not separate, regardless of whether the article is washed, dry-cleaned, wetted or the like. The simulated beads provided in accordance with my present invention have permanent brightness because the ornamental particles are protected in the interior of the respective bead-like prominence. Furthermore, an article provided with beading in this manner is light because the weight of the individual bead-like constructions is considerably less than that of conventional beads.

It is also evident that beading of this type may be provided not only on garments or the like, but also on wall paper, furniture, other types of wall coverings, or in fact almost any type of base, including textile materials, plastics, leather, glass, wood and the like. In fact, such beading may even be provided on a metallic base if desired.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
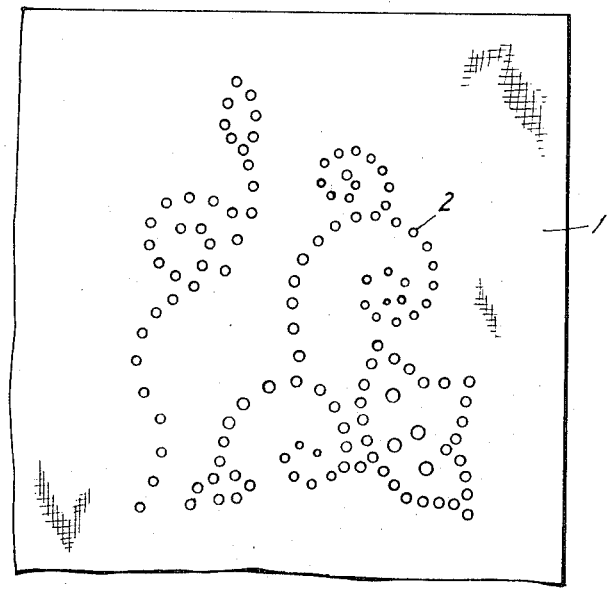
FIG. 1 is a fragmentary somewhat diagrammatic plan view of a beaded article made in accordance with the present invention.
Figure 2:
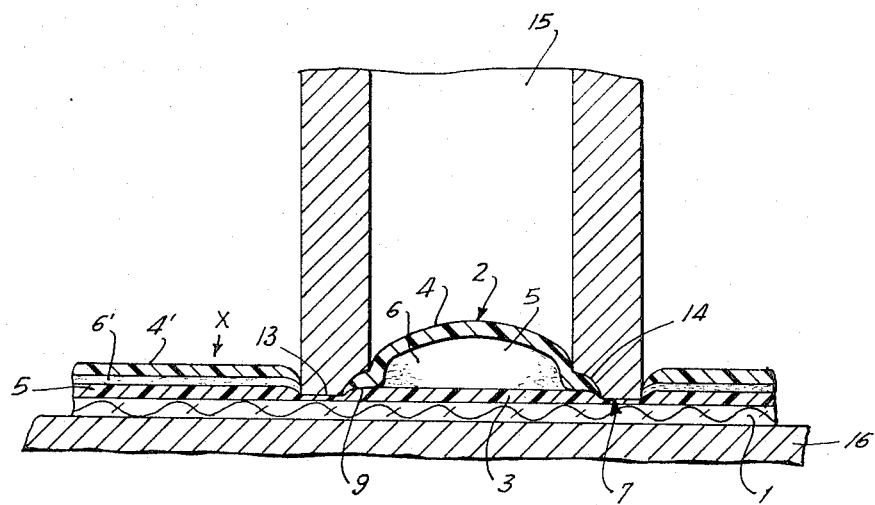
FIG. 2 is a fragmentary elevation showing a bead according to the present invention being formed by a single die.

Discussing now the drawing in detail, and firstly FIGS. 1 and 2 thereof, it will be seen that I have illustrated in FIG. 1 a beaded article which here shall be assumed to consist of a textile base layer 1 on which I have superimposed a bottom layer 3 and a top layer 4. In the illustrated embodiment both the top layer 4 and the bottom layer 3 consist of synthetic plastic material, for instance polyvinyl chloride, although it will be appreciated that they need not be of the identical material. Spacing means is interposed between the layers 2, 3 and 4, and this is here illustrated (compare FIG. 2) as a layer 6' consisting of a plurality of discrete particles 6, as clearly shown in FIG. 2. The particles 6 are brightly colored and may be fine slivers of polyester, nylon or the like, but it should be understood that other materials are similarly suitable. The sheet 4 in the illustrated embodiment is transparent, preferably clear, so that the particles 6 are visible. A support 16 is provided in form of a table, plate or the like on which the layers 1, 3, 4 and 6' are temporarily supported. At least one of the layers 3 or 4 is heat-bondable and capable of plastic flowing when exposed to the requisite conditions.

I provide a mold which will be discussed in further detail with reference to FIGS. 3 and 4 and which is provided with as many mold portions as beads or bead-like prominences as they might more properly be called, are to be provided. These prominences are identified with reference numeral 2 and may be distributed, as shown in FIG. 1, in any desired manner, order or pattern.

Each of the mold portions which is operative for making one of the prominences 2 is of the general type shown in FIG. 2 in that it is provided with recess 15 whose open end is surrounded by cutting and pressure edge 13 to which there is inwardly adjacent a beveled shoulder 14.

To make an article of the type under discussion and shown in FIG. 1, an assembly consisting of the layers, 3, 4 and 6' is superimposed upon the support layer 1 and the total assembly is rested on the plate or table 16. Thereupon the die is moved downwardly in the direction of the arrow X shown in FIG. 2 so that the cutting and pressure edge 13 engages a circumferentially complete narrow annular zone of the assembly, pressing the layers 4 and 6 against the layer 3 and all of them against the support layer 1. This results in the inclusion of an area of the top layer 4 within the recess 15, this area being normally circular but which may also be of other-than-circular outline. Simultaneously the mold is heated as will be discussed below, and this results in heat-bonding of the layers 3 and 4 to one another as well as to the base or support layer 1. Such bonding takes place along the circumferentially complete narrow annular zone corresponding to the cutting and pressure face 13, it being understood that at least the layer 4, and generally the layers 3 and 4, consist of thermoplastic material. Because of the beveled shoulder 14 the material of the bead-like prominence 2 which is being produced is of but little changed thickness in the region 9, that is the region below the beveled shoulder 14. The region below the cutting and pressure face 13, however, is melted and drastically reduced in thickness, as evident from FIG. 2. This results in severing of the portions 4', 6' and 3' of the respective layers, 4, 6 and 3 from the portions located within the confines of the die. The air entrapped between the layers 3 and 4 in the pockets existing between the individual particles of the layer 6 expands as a result of the heat-bonding of the layers 1, 3 and 4 and results in the region 5 in plastic deformation of the layer 4 within the confines of the recess 15 in direction radially inwardly from the narrow annular zone 8 — in which the layers are bonded together — as well as in direction away from the bottom layer 3 and deeper into the recess 15. The result is a hollow self-supporting beadlike prominence 2 which, because of its dome-shape and because of the inherent resistance of the material of the layer 4 to deformation, is capable of withstanding stresses tending to collapse it when the air in its interior cools and has its expansion reversed. The formation of the prominence 2 may be aided by proper selection of the bevel of the shoulder 14, serving, when pressure is exerted in the manner shown in FIG. 2 in the direction of the arrow X, to initiate plastic flowing of the material of the layer 4 radially inwardly and in direction deeper into the recess 15. In fact, bonding of a type other than heat-bonding is conceivable and it is also conceivable that by proper configuration of the beveled shoulder 14, the prominence 2 could be provided in the case without the aid of expanding air simply as a result of plastic flowing of the material of the layer 4 resulting from pressure exerted on it by the die.

It will be appreciated that in FIG. 2 only a portion of the die used for FIG. 1 has been illustrated, and that the analogous process takes place simultaneously for all of the various prominences 2 which are shown in FIG. 1. This can, of course, be done sequentially but preferably it is done simultaneously, with the die being configurated accordingly, as will be discussed. When the article is completed and the various prominences are provided as shown in FIG. 1, the die is withdrawn in direction opposite the arrow X in FIG. 2, and the severed remainders 3', 4' and ' of the layers 3, 4 and 6 may be peeled away, thus leaving only the prominences 2 attached to the support or base layer 1. The cutting edge along which the severing occurs is identified with reference numeral 7 in FIG. 2.

Figure 3:
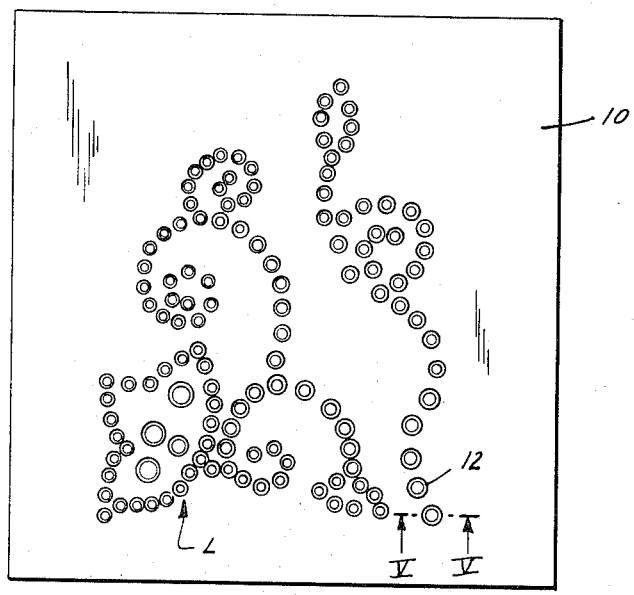
FIG. 3 is a view similar to FIG. 1, but illustrating the die used for making the article shown in FIG. 1.
Figure 4:
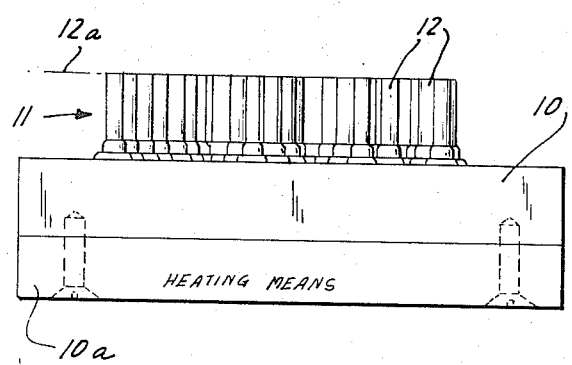
FIG. 4 is a side-elevational view of FIG. 3.

Coming now to FIGS. 3 and 4 it will be seen therein that I have rather diagrammatically illustrated a die for making the article shown in FIG. 1. It will be seen that in this embodiment the die comprises base means 10 in form of a platen provided with wall means 11 having an exposed face 12a. In the illustrated embodiment the wall means 11 is constituted by a plurality of tubular mold portions 12 of the configuration shown for instance in FIGS. 2, 5 and 6. The free end faces of these mold portions 12 together constitute the exposed face 12a and, as shown in FIG. 2 for example, the exposed face 12a is provided with a plurality of recesses 15 extending inwardly and forming the pattern P. Suitable heating means 10a is provided, connected with the platen 10 for heating the same and thereby the wall means 11.

Figure 5:
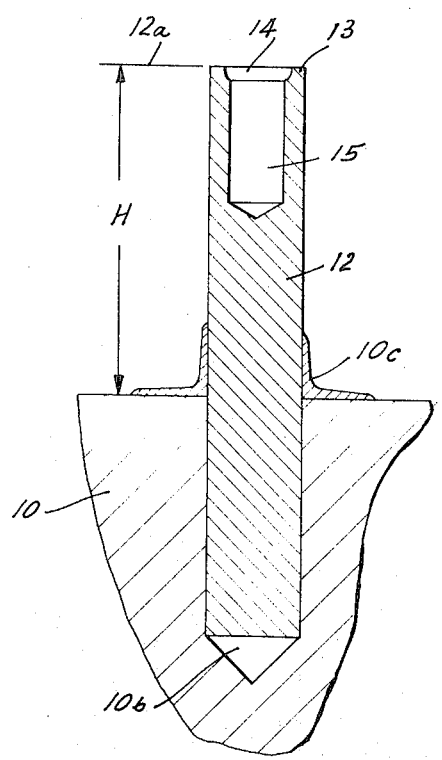
FIG. 5 is a section taken on the line V—V of FIG. 3.

As shown in FIG. 5, which is the section taken on the line V—V of FIG. 3, the tubular wall means may be provided in form of a plurality of pins 12 each of which is received in a bore 10b provided in the base means 10 and rigidly retained therein, for instance by a weld 10c. The distance to which each of the pins 12 projects from the base means 10 is identified with reference numeral H and it will be seen that the free end faces of each of the pins 12 are located, as illustrated by the dimension H, in a common plane which is the exposed face 12a of the wall means 11. Reference numerals 13, 14 and 15 identify features which have already been discussed with respect to FIG. 2.

Figure 6:
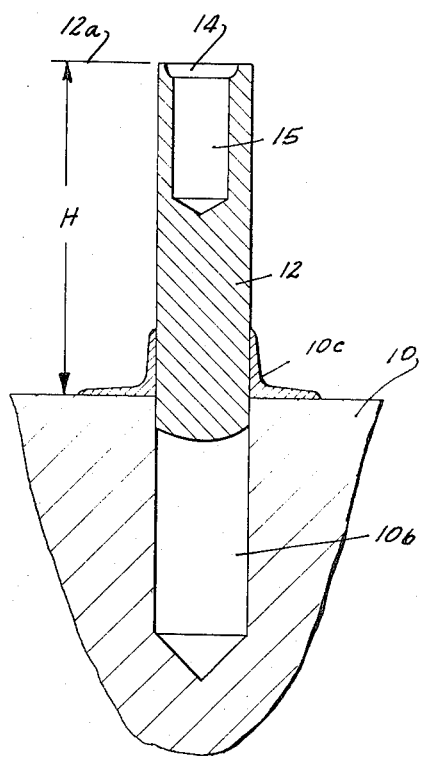
FIG. 6 is a view similar to FIG. 5 but illustrating another embodiment.

FIG. 6 differs from FIG. 5 only in that it illustrates that the respective pins 12 need not fill the bores 10b in the member 10, but can also be shorter. Evidently, the bores 10b themselves could be of lesser depth in this case.

The heating means illustrated may be of conventional type, and is well known in the art. In fact, it has been discussed in some more detail in my copending application to which reference may be had.

Figure 7:
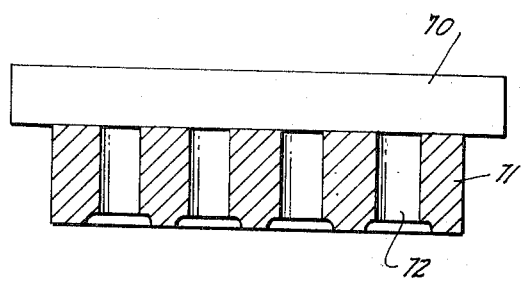
FIG. 7 is a diagrammatic partly sectioned view illustrating a further embodiment of the die.
Figure 8:
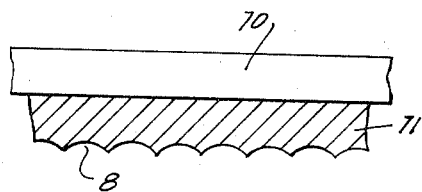
FIG. 8 is a view similar to FIG. 7 but illustrating yet another embodiment of the die.

The embodiment in FIG. 7 illustrates that instead of the tubular wall means the base means which is here identified with reference numeral 70 may be provided with wall means 71 having recesses 72 whose configuration corresponds to that of the recesses 15 provided in FIG. 5. The cutting edges and the beveled shoulders are the same and are therefore not specifically identified with reference numerals. In the embodiment of FIG. 7 the recesses extend through the entire thickness of the wall means 71. FIG. 8, on the other hand, shows that the recesses 80 need not extend over the entire thickness of the wall means 71 carried by the base means 70, but can be of such a depth as only to allow the desired height of the prominences 2 to be formed. In other words, whereas the recesses 72 are higher than necessary for the formation of the prominences 2, the recesses 80 in FIG. 8 need be only of such height that the prominences 2 can just form.

It will be appreciated, of course, that where the tubular wall means or projection of the type shown in FIG. 4, for instance, is provided, all of the individual tubular members must extend in parallelism with one another.

The interior of the prominences 2 is only partially filled, as shown in FIG. 2, with the ornamental particles of the layer 6. It is emphasized that if these ornamental particles are made from certain materials, such as polyester, nylon or the like, they will adhere electrostatically to the inside of the wall forming the respective prominence 2, and this assures that they are readily visible and provide the desired visual effect.

Resort to my present invention results in the provision of bead-like prominences of strictly uniform configuration and strictly uniform type. Evidently, as many or as few of the prominences 2 as desired may be provided in a single operation, and thus by novel invention is particularly suitable for mass production at low cost, but is also capable of being used for individual production of one or a few of the prominences 2 at a time.

It is also emphasized that different sizes and shapes may be selected for the prominences, so that these need not be circular but can also be oval, rectangular, or in fact of a great variety of different shapes. Evidently, the single die may be provided with means for producing two or more different-shaped prominences at the same time. Also, it is possible to provide continuous sheets or strips of base or support material with the prominences 2, and in this case the pattern will recur at intervals which are determined by the size of the mold being used. Naturally, there is no limit on the type of pattern which may be provided, and this may be accomplished either by providing a single die with the desired pattern, or utilizing a die capable of producing one or only a few of the prominences 2 at a time and moving the die and/or the support or base material in such a manner as to obtain the pattern by repeated use of the die.

It is still emphasized that the provision of the individual particles of the layer 6 results in random scattering of light impinging on these particles through the portion of the layer 4 which constitutes the respective dome-shaped prominence 2, and this increases the brilliance of the prominences several times when direct light impinges upon them. The individual bead-like prominences are waterproof so that water cannot enter into them. Individual ones of the prominences 2 may be spaced as closely as 1 mm and as many as 2,500 or even more individual prominences 2 may be produced at one and the same time. The versatility of my invention will thus be obvious.

Evidently, it is possible to provide the desired pattern of prominences 2 not on a garment or the like, but on a patch which need not be of textile material, and which can then be suitably fixed to an article on which it is desired, for instance by sewing, by use of an adhesive or the like.

It will be understood that each of the elements described above, or two or more together, may also find a useful employment in other types of applications differing from the types described above.

While the invention has been illustrated and described as embodied in a method of making a beaded article, it is not intended to be limited to the details shown, since various modifications and structural changes may be made without departing in any way from the spirit of the present invention.

What is claimed as new and desired to be protected by Letters Patent is set forth in the appended claims.

I claim:

1. A method of making an ornamented article, comprising the steps of confining an intermediate layer of discrete particles between a bottom layer and a top layer having an exposed surface, the material of at least one of said top and bottom layers being thermoplastic and said top layer being plastically flowable; pressing said top layer against said bottom layer in at least one circumferentially complete narrow marginal zone; heat-bonding said top and bottom layers to one another in said circumferentially complete narrow marginal zone; and forming in said top layer a raised self-supporting bead which projects beyond the level of said surface by engaging said top layer under pressure with a die and thereby forcing said top layer to flow plastically in direction inwardly and upwardly away from said zone simultaneously with the step of heat-bonding said top and bottom layers to one another, said bead being circumscribed by the associated marginal zone and containing confined particles of said intermediate layer.

2. A method as defined in claim 1, wherein said particles are ornamental particles, and wherein said top layer is transparent for permitting viewing of the confined particles in said bead.

3. A method as defined in claim 1, further comprising the step of maintaining said top layer spaced from said bottom layer by entrapping gas between said layers, and effecting expansion of said gas in said confined area.

4. A method as defined in claim 3, wherein said top layer is thermoplastic material subject to softening under the influence of heat.

5. A method as defined in claim 4, said bead being dome-shaped, and the thickness of said top layer being so selected as to resist, in conjunction with the dome shape, collapse of said bead when said gas contracts on cooling subsequent to said expansion.

6. A method as defined in claim 1, further comprising the step of severing at least said top layer at least concomitantly with the step of heat-bonding said layers to one another.

7. A method as defined in claim 1, wherein said material of said top layer is polyvinylchloride.

8. A method as defined in claim 1, wherein said top and bottom layers are gas impermeable.

* * * * *